3,567,712
10β-AMINO-ESTRANES AND METHOD FOR
THE PREPARATION THEREOF
Pietro de Ruggieri, Carmelo Gandolfi, and Umberto
Guzzi, Milan, Italy, assignors to Gruppo Lepetit S.p.A.,
Milan, Italy
No Drawing. Filed Oct. 19, 1967, Ser. No. 676,601
Claims priority, application Italy, Oct. 31, 1966,
29,501/66
Int. Cl. C07c *169/24*
U.S. Cl. 260—239.5        16 Claims

ABSTRACT OF THE DISCLOSURE

10β-amino-steroids of the estrane series and a method for the preparation thereof.

Novel compounds of the present invention include the following:

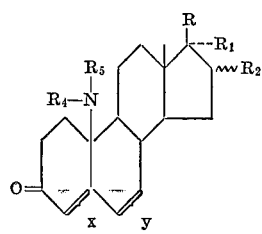
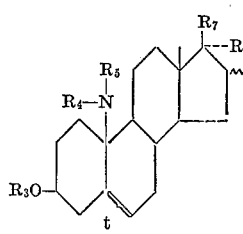
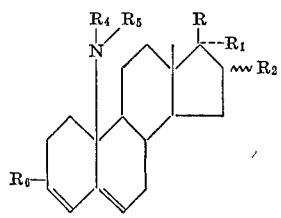
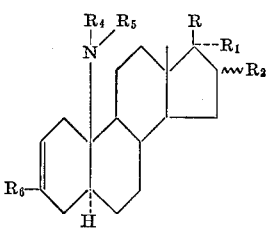
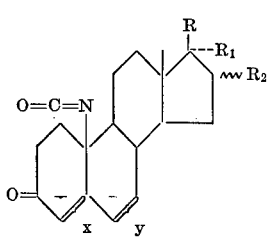
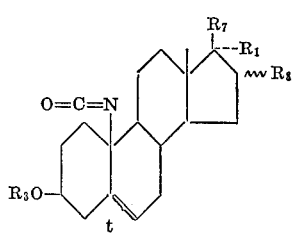

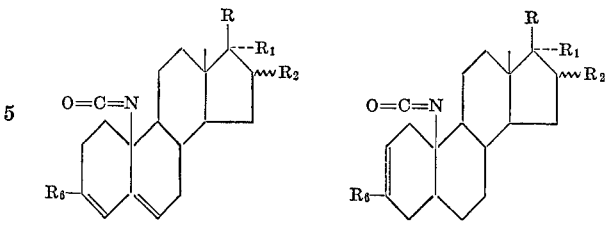
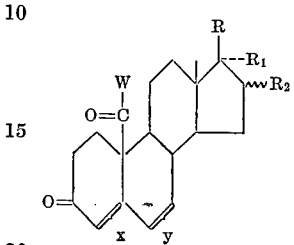
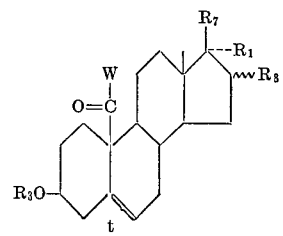
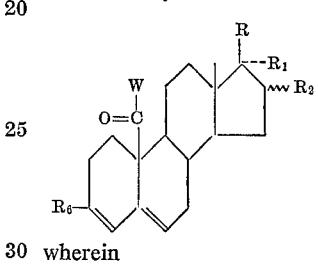
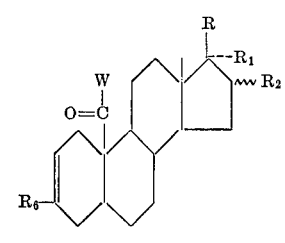

wherein

R is —$C_8H_{17}$, hydroxy, 2'-tetrahydropyranyloxy or acyloxy where the acyl group is derived from a saturated aliphatic carboxylic acid containing 1 to 10 carbon atoms, a cycloaliphatic acid such as cyclopentylacetic, cyclopentylpropionic or cyclohexylpropionic acid, a dicarboxylic acid such as succinic, glutaric or methylsuccinic acid or an aromatic or arylaliphatic acid such as benzoic, salicylic, p - aminobenzoic, phenylpropionic or phenylacetic acid; $R_1$ is hydrogen, lower alkyl, alkyne of the formula —C≡CRa or alkene of the formula —CH=CHRa and wherein Ra is hydrogen or lower alkyl;

R and $R_1$ or $R_7$ and $R_1$ together are keto, $$\begin{matrix}-O-CH_2\\|\\-O-CH_2\end{matrix} \text{ or } \begin{matrix}-S-CH_2\\|\\-S-CH_2\end{matrix}$$

$R_2$ is hydrogen, hydroxy, lower alkyl or halogen such as chlorine or bromine;

$R_3$ is hydrogen, formyl, acetyl or benzylcarboyl;

$R_4$ is hydrogen or methyl;

$R_5$ is hydrogen, methyl, acyl where the acyl group is derived from a saturated aliphatic carboxylic acid containing 1 to 10 carbon atoms, a cycloaliphatic acid such as cyclopentylacetic, cyclopentylpropionic, or cyclohexylpropionic acid, a dicarboxylic acid such as succinic, glutaric or methylsuccinic acid or an aromatic or arylaliphatic acid such as benzoic, salicylic, p-aminobenzoic, phenylpropionic or phenylacetic acid or —$COOR_9$ or —$CONHR_9$ where $R_9$ is methyl, ethyl, propyl, butyl, cyclohexyl, phenyl or phenylmethylene;

$R_6$ is methoxy, ethoxy, morpholino, pyrrolidyl or piperidino;

$R_7$ is acyloxy where the acyl group is derived from a saturated aliphatic carboxylic acid containing 1 to 10 carbon atoms, a cycloaliphatic acid such as cyclopentylacetic, cyclopentylpropionic or cyclohexylpropionic acid, a dicarboxylic acid such as succinic, glutaric or methylsuccinic acid or an aromatic or arylaliphatic acid such as benzoic, salicylic, p-aminobenzoic, phenylpropionic or phenylacetic acid;

$R_8$ is hydrogen or lower alkyl;

W is chlorine, bromine, $-N_3$, $-NHOCOC_6H_5$, $NH_2$ or $-OCOR_{10}$ where $R_{10}$ is methyl, ethyl, propyl, butyl, cyclohexyl, phenyl or phenylmethylene;

$x$, $y$ and $t$ each represent a single or double bond;

ξ indicates here and throughout the specification that each of $R_2$ and $R_8$ may have the $\alpha$ or $\beta$ configuration and wherein C–5 has the $\alpha$ configuration when $t$ represents a single bond or when both of $x$ and $y$ represent a single bond.

The compounds of the present invention are endowed with androgenic, anabolic, "progestive" hypophsial block anesthetic, hypnotic, and sedative activity and are prepared, for example by starting with compounds of the following formula:

Reaction scheme I illustrates the reaction of a 10β-carboxy compound or an alkali metal salt thereof (e.g., lithium, sodium or potassium) with a chlorinating agent such as thionyl chloride, oxalyl chloride, $PCl_5$ or $POCl_3$ in a solvent such as an ether (e.g., ethyl ether or isopropyl ether), benzene, toluene, hexane, dimethylformamide to form an acid chloride which, either raw or isolated, is allowed to react with an alkali metal azide, ammonia or hydroxylamino yield the corresponding 10β-carbonylazide, 10β-carbamoyl or 10β-hydroxaminic acid (which is then benzoylated) intermediate which, in a medium such as benzene, water, acetic acid, hydrochloric acid, ether or mixtures thereof, undergoes a Curtius rearrangement to give 10β-amino-steroids of the following formula:

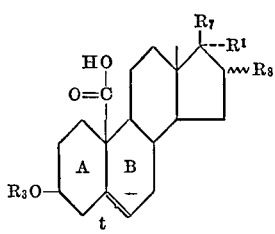

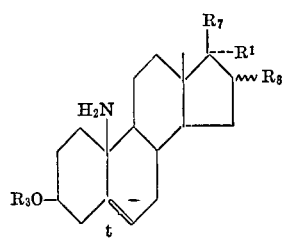

wherein:

$R_1$, $R_3$, $R_7$, $R_8$ and $t$ have the same meaning set forth hereinbefore and wherein C–5 has the $\alpha$ configuration when $t$ represents a single bond.

wherein $R_1$, $R_3$, $R_7$, $R_8$ and $t$ have the same meaning set forth hereinbefore and wherein C–5 has the $\alpha$ configuration when $t$ represents a single bond.

Scheme I:

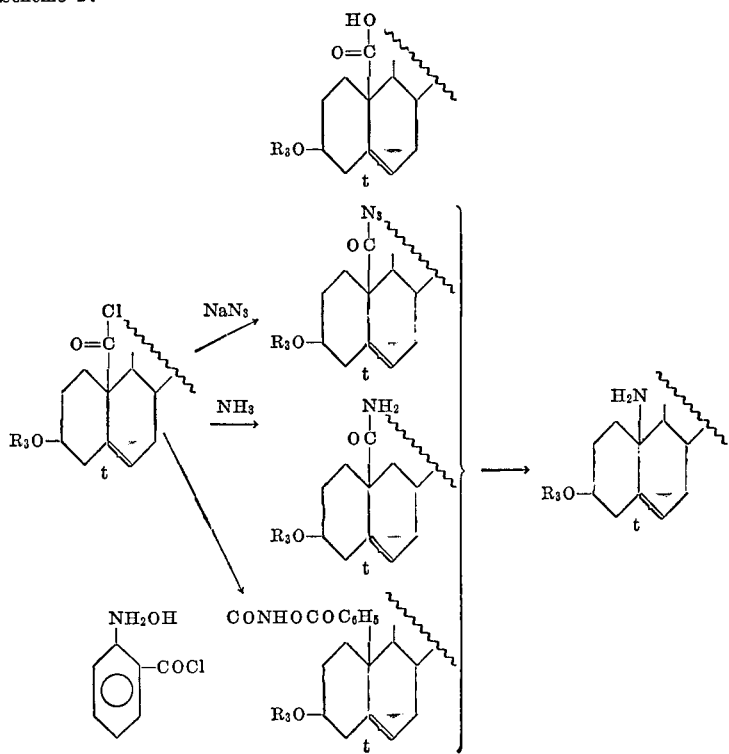

Scheme II:

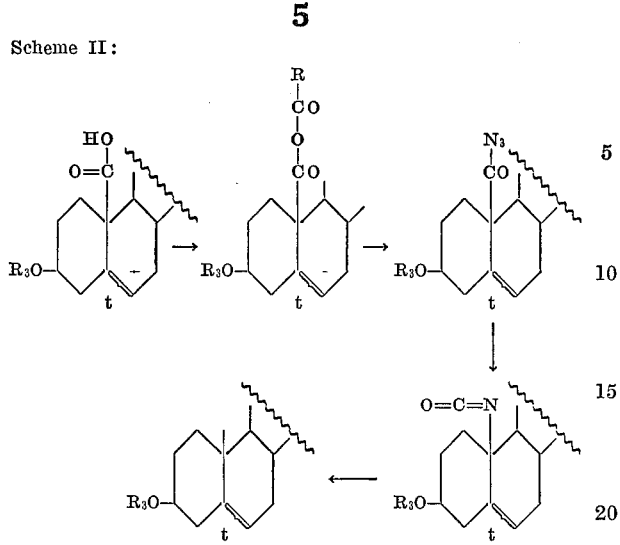

Reaction scheme II illustrates the reaction of a 10β-carboxy compound with ethyl chlorocarbonate in the presence of triethylamine or an acid of the formula RCOOH wherein R is methyl, ethyl, propyl, butyl, cyclohexyl, phenyl or phenylmethylene in a solvent such as acetone, tetrahydrofurane, dioxane, benzene or dimethyl formamide to yield a 10β-carboxyanhydride compound which either raw or isolated, is allowed to react with an alkali metal azide, $NH_3$ (not shown) or $NH_2OH$ and then benzoyl chloride (not shown) to give the corresponding intermediate which, in a medium such as benzene, toluene or ether undergoes Curtius rearrangement to yield the 10β-isocyanato-steroids of the following formula:

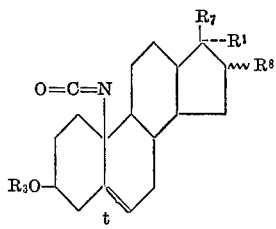

By treatment with hydrochloric acid, acetic acid, water, ether or mixtures thereof, said 10β-isocyanato-steroids are converted into 10β-amino-steroids of the following formula:

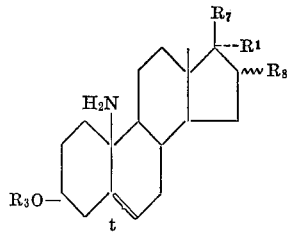

wherein $R_1$, $R_3$, $R_7$, $R_8$ and $t$ have the same meaning set forth hereinbefore and wherein C–5 has the α configuration when $t$ represents a single bond.

Starting with these 10β-amino-5-α-hydrogen-estranes or 10β-amino-estr-5-enes where $$\left( R^3 \text{ is H or } \underset{HO}{\overset{O}{\underset{\|}{C}}} \right)$$

compounds of the formula:

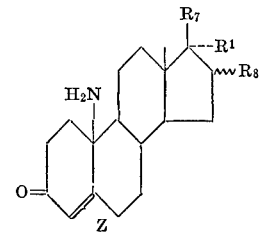

are obtained by Oppenauer reaction wherein $R_1$, $R_7$ and $R_8$ are as set forth hereinbefore, $z$ represents a single or double bond and wherein C–5 has the α configuration when $z$ represents a single bond.

By starting with 10β-amino-estr-4-ene-3,17-dione and by reacting with a secondary amine such as pyrrolidine, morpholine or piperidine in a solvent such as benzene, toluene, xylene in the presence of a catalyst such as p-toluensulfonic acid or the corresponding secondary amine hydrochloride, the corresponding 3-enamine of Formula I is obtained.

Scheme III:

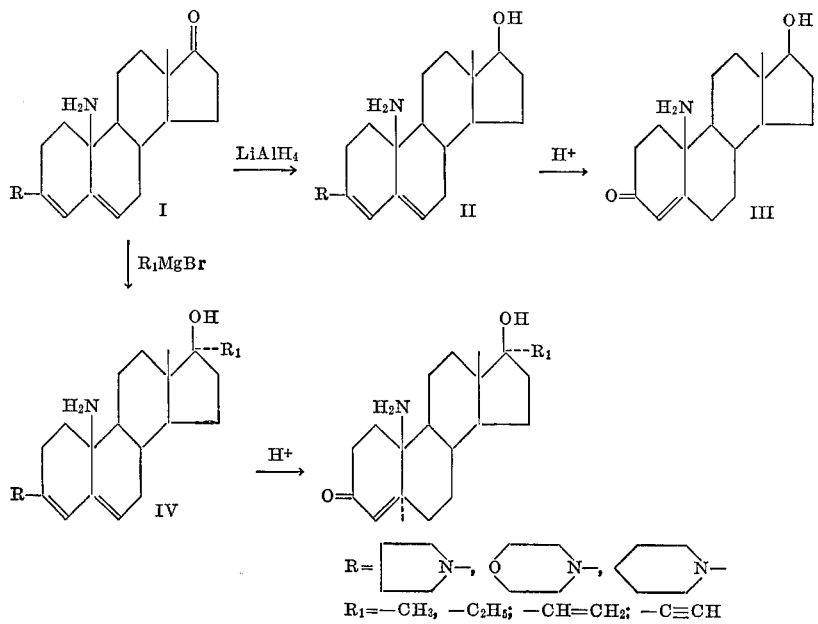

According to reaction scheme III, after reduction with LiAlH₄ the enamine of Formula II is split through boiling with a mixture of acetic acid, sodium acetate and water to form the 10β-amino-testosterone of Formula III. The reaction of the enamine of Formula I with a Grignard reactant such as methylmagnesium bromide, ethyl magnesium bromide and vinylmagnesium or ethinyl magnesium chloride produces the enamine of Formula IV. Subsequent splitting of the enamine leads to 10β-amino-estr-4-ene-3-ones, 17α-substituted steroids ($R_1$=$CH_3$, $C_2H_5$, —CH=$CH_2$, —C≡CH). In analogous manner, by starting with 10β-amino-5α-hydrogen estrane-3,17-dione (Ia) according to process scheme IV, the 10β-amino-5α-hydrogen-estrane-17β-ol-3-one and the 17α-substituted derivatives thereof (VIa) are obtained ($R_1$=$CH_3$, $C_2H_5$, HC=$CH_2$, —C≡CH).

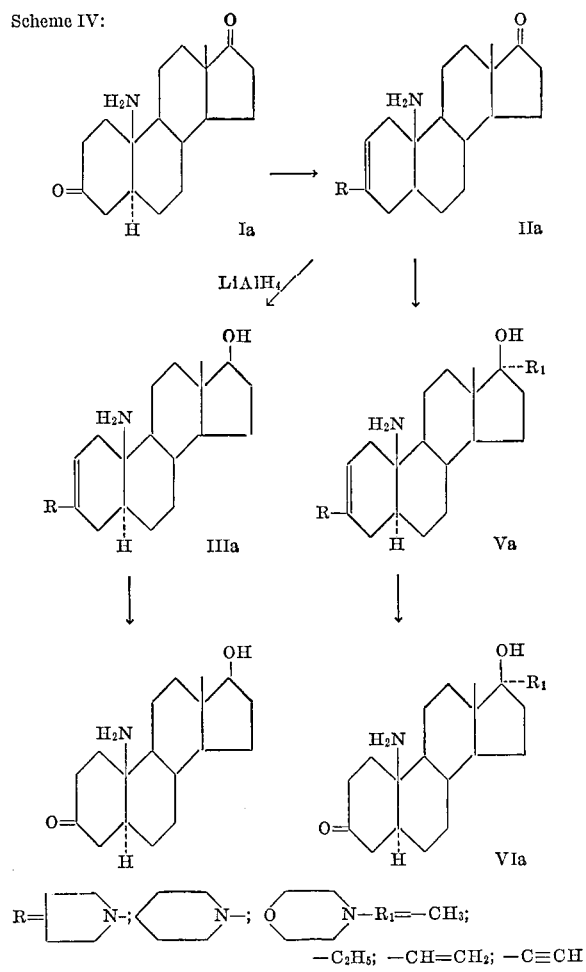

Scheme IV:

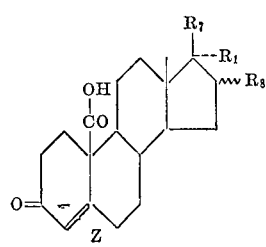

The same compounds are obtained by starting with compounds of the following formula wherein $R_1$, $R_7$, $R_8$ and z have the same meaning as set forth hereinbefore and wherein C–5 has the α configuration when z represents a single bond.

This reaction is shown in reaction scheme V below

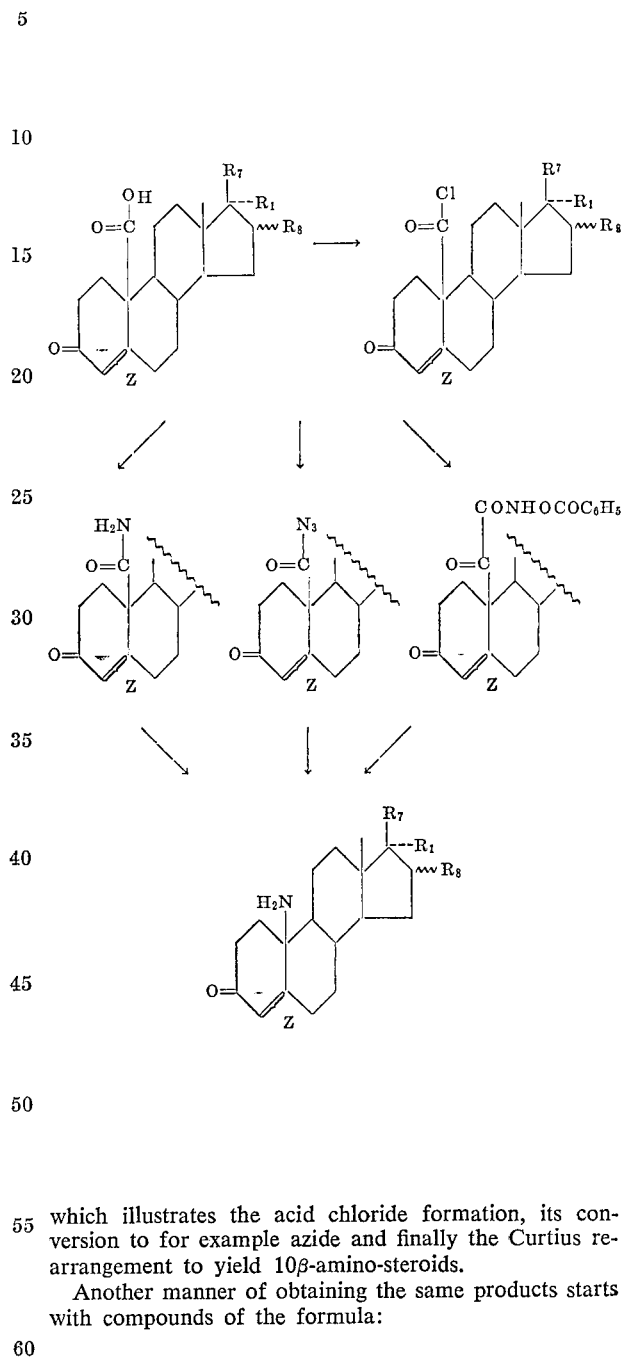

which illustrates the acid chloride formation, its conversion to for example azide and finally the Curtius rearrangement to yield 10β-amino-steroids.

Another manner of obtaining the same products starts with compounds of the formula:

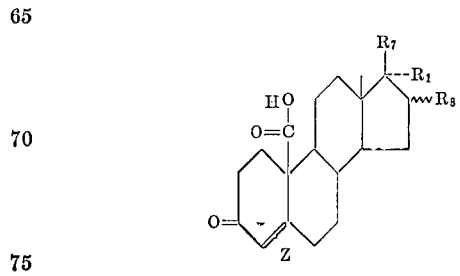

and is illustrated by reaction scheme VI

Scheme VI:

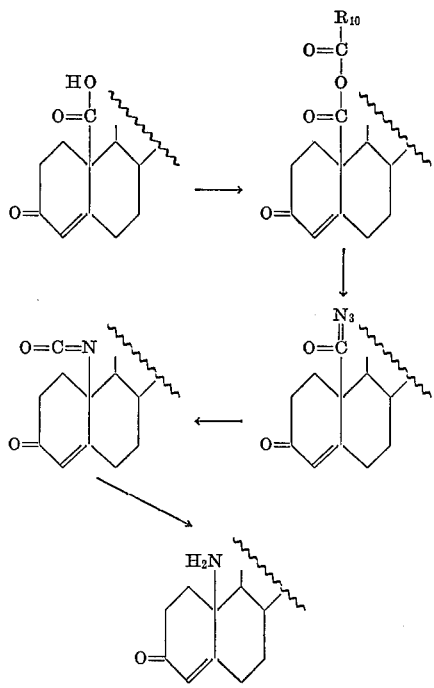

wherein the formation of mixed 10β-carboxy-anhydride, the conversion thereof to, for example, 10β-carbonylazide and finally the rearrangement to 10β-isocyanato derivative, and then the passage to 10β-amino steroid occurs.

Reaction of 10β-amino-ester-4-ene-3-ones of the following formula

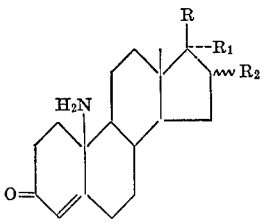

wherein R, $R_1$ and $R_2$ have the same meaning as set forth hereinbefore, with alcohols such as anhydrous methanol or ethanol in the presence of acids such as hydrogen chloride, p-toluenesulfonic acid, sulfonic acid, trichloroacetic acid, trifluoracetic acid allows the preparation of compounds of the formula

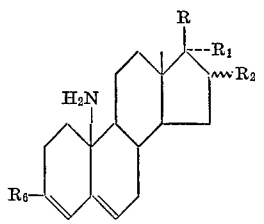

wherein R, $R_1$ and $R_2$ have the same meaning as set forth hereinbefore and $R_6$ is methoxy or ethyoxy.

These compounds are also obtained by applying the reaction Scheme IV to the compounds of the formula

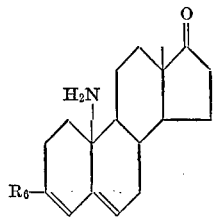

wherein $R_6$ is methoxy or ethoxy as shown in reaction scheme VII of methyl.

Scheme VII:

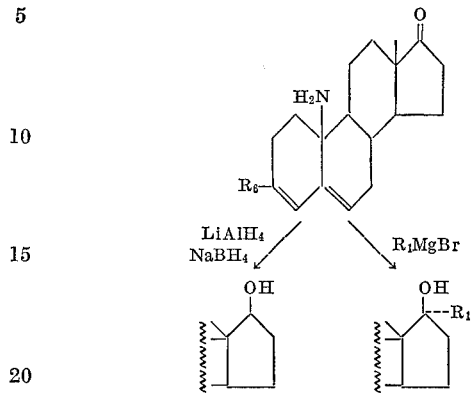

$R_1 = -CH_3; -C_2H_5; -CH=CH_2; -C\equiv CH$

From the above described 10β-amino-estra-3,5-diene-3-enolethers, by reaction with 2,3-dicyan-5,6-dichloro-benzoquinone in a solvent such as benzene, dioxane, acetone, water or mixtures thereof according to the following reaction scheme,

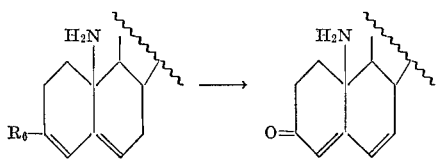

the corresponding 10β-amino-estra-4,6-diene-3-ones of the following formula are obtained:

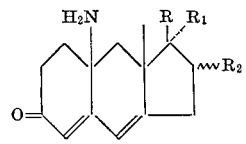

wherein
R, $R_1$ and $R_2$ have the same meaning as set forth hereinbefore.

The following non-limitative examples illustrate the invention:

EXAMPLE 1

10β-isocyanato-19-nor-androst-5-ene-3,17-diacetate

To 8.660 parts of 10-β-carboxy-19-nor-androst-5-ene-3,17-diacetate dissolved in 900 parts anhydrous benzene were added 18 parts of thionyl chloride and the mixture was allowed to reflux for 8 hours, then evaporated to dryness and the thionyl chloride was removed by 3 successive distillations with anhydrous benzene to obtain 10β-chloroformyl-19-nor-androst-5-ene-3,17-diacetate.

The obtained product was dissolved in 160 parts anhydrous acetone and 3 parts sodium azide were added. Stirring was continued for 3 hours. Acetone was cold distilled and then the product was diluted with water. The product did not crystallize therefore it was extracted with ethyl ether, dehydrated with sodium sulfate and evaporated to dryness to obtain the 10β-carbonylazide-19-nor-androst-5-ene-3,17-diacetate. The product showed under I.R. spectrum analysis the characteristic band of azide: 2120 cm.$^{-1}$.

100 parts toluene were added to the residue and it was allowed to stand on a steam bath for 2 hours. By evaporation to dryness, 10β-isocyanato-19-nor-androst-5-ene-3,17-diacetate was obtained: I.R. 2220 cm.$^{-1}$ (N=C=O).

EXAMPLE 2

10β-isocyanato-19-nor-androst-5-ene-3-acetate-17-one

By operating as described in Example 1, but starting with 10β-carboxy-19-nor-androst-5-ene-3-acetate-17-one, 10β-isocyanato-19-nor-androst-5-ene-3-acetate-17-one was obtained.

EXAMPLE 3

10β-amino-19-nor-androst-5-ene-1,17-diacetate 5.6 parts of 10β-isocyanato-19-nor-androst-5-ene-3,17-diacetate were suspended in 100 parts of 50% acetic acid. The mixture was allowed to stand on a steam-bath for 2 hours, then concentrated under vacuum to dryness and then diluted with water. After extraction with ethyl acetate, the product was washed with 10% sodium bicarbonate and then with water until neutrality. The product was then dehydrated on sodium sulfate and evaporated to dryness. The product crystallized from ethyl ether to afford 5 parts of 10β-amino-19-nor-androst-5-ene-3,17-diacetate which had a M.P. of 166°–168° C. and a $\alpha_D$ ($CHCl_3$) of —102°.

EXAMPLE 4

10β-amino-19-nor-androst-5-ene-3-acetate-17-one

Operating similarly to Example 3, from 10β-isocyanato-19-nor-androst-5-ene-3-acetate-17-one, 10β-amino-19-nor-androst-5-ene-3-acetate-17-one was obtained which had a M.P. of 181°–182° C. and a $\alpha_D$ ($CHCl_3$) of 35°.

EXAMPLE 5

10β-carbomethoxyamino-19-nor-androst-5-ene-3,17-diacetate 1.5 parts of 10β-isocyanato-19-nor-androst-5-ene-3,17-diacetate are refluxed in methanol for 3 hours, then evaporated to dryness to obtain a product under oily form. A separation is carried out on silica-gel column, by employing 50 parts silicagel, while eluating with methylene chloride. Finally 0.050 part 10β-urethane-19-nor-androst-5-ene-3,17-diacetate are obtained; M.P. 178°–180° C.; I.R. 1530 cm.$^{-1}$ (urethane).

EXAMPLE 6

10β-amino-19-nor-androst-5-ene-3,17-diol

One part of 10β-amino-10-nor-androst-5-ene-3,17-diacetate in 24 parts of methanolic KOH is allowed to reflux for one hour. The product was then evaporated to dryness, neutralized with monosodium phosphate and extracted 5 times with ethyl acetate. The combined organic phases were washed with a little salt water, dehydrated with sodium sulfate and evaporated to dryness to afford 0.75 part of 10β-amino-19-nor-androst-5-ene-3,17-diol.

EXAMPLE 7

10β-amino-19-nor-androst-5-ene-3β-ol-17-one

In a manner similar to Example 6, while starting with 10β-amino-19-nor-androst-5-ene-3-acetate-17-one, 10β-amino-19-nor-androst-5-ene-3β-ol-17-one was obtained; M.P. 178°–179° C.; $\alpha_D$($CHCl_3$)=45°.

EXAMPLE 8

10β-amino-19-nor-androst-4-ene-3,17-dione 0.7 part of 10β-amino-19-nor-androst-5-ene-3,17-diol were suspended in 130 parts toluene and 6.5 parts cyclohexanone. 25 parts toluene were slowly distilled and then 1.2 parts aluminum isopropylate in 18 parts toluene were added within 15 minutes under stirring. The mixture was allowed to reflux for 16 hours, then cooled and then 3.8 parts Seignette salt dissolved in 5.4 parts water were slowly added. Stirring was continued for 15 minutes and the two layers separated. The organic phase after water washing was set aside and the aqueous phase, reepatedly washed with benzene, was discarded. The combined organic phases were steam-distilled. The residue was extracted with methylene chloride to obtain 0.35 part of 10β - amino-19-nor-androst-4-ene-3,17-dione; M.P. 196°–199° C.; $\lambda_{max}$=234 m$\mu$, $\epsilon$=14,500.

EXAMPLE 9

10β-amino-3-ethoxy19-nor-androsta-3,5-diene-17-one 0.3 part of 10β-amino-19-nor-androst-4-ene-3,17-dione were dehydrated with benzene and dissolved in 1.6 parts anhydrous dioxane. 0.18 part p-toluene sulfonic acid (dehydrated in benzene) were added. When the whole mass was in solution, 0.4 part freshly distilled triethyl orthoformate were added as well as 0.27 part of a solution of the following composition: 0.244 part p-toluenesulfonic acid, 2.7 parts anhydrous dioxane and 0.55 part absolute ethanol. The reaction mixture was left at room temperature for 14 hours and then 10 parts of water containing 0.4 part sodium bicarbonate were added. The mixture was then evaporated to dryness and extracted several times with methylene chloride. The residue was washed with salt water, dehydrated on sodium sulfate and evaporated to dryness.

The product crystallized from ethyl ether, yielding 0.170 part of 10β - amino-3-ethoxy-19-nor-androsta-3,5-diene-17-one; M.P. 172°–175° C.; $\lambda_{max}$ (ethanol)=243 m$\mu$; $\epsilon$=21,500; I.R. 1740 cm.$^{-1}$ (17-ketone); 1655, 1628 cm.$^{-1}$ (3-ethoxy-3,5-diene).

EXAMPLE 10

10β-amino-3-N-pyrrolidyl-19-nor-androsta-3,5-diene-17-one 0.25 part of 10β-amino-19-nor-androsta-3,5-diene-17-one were refluxed in 15 parts benzene in the presence of a marcusson. After 15 minutes, 0.015 part p-toluenesulfonic acid were added, then, after half an hour, 1.25 parts pyrrolidine. The mixture was allowed to reflux for 12 hours, then cooled and washed with a cold sodium carbonate solution and then with water to neutrality. The residue was dehydrated on sodium sulfate and evaporated to dryness. 0.3 part of product were obtained which were chromatographed on basic alumina to afford 0.165 part 10β - amino-3-N-pyrrolidyl-19-nor-androsta-3,5-diene-17-one; M.P. 141°–143° C. $\lambda_{max}$=275 m$\mu$; $\epsilon$=18,750.

EXAMPLE 11

10β-amino-19-nor-tetosterone 0.3 part of 10β-amino-3-N-pyrrolidyl-19-nor-androsta-3,5-diene-17-one were dehydrated in benzene and dissolved in 20 parts anhydrous tetrahydrofurane. 0.45 part lithium aluminum hydride were added, and the mixture was kept under stirring for 2 hours at room temperature. A saturated sodium sulfate solution was added dropwise. Diluting with ethyl acetate resulted in the formation of two phases. The aqueous phase was extracted with ethyl acetate and the combined organic phases were washed with water to neutrality. The product was dehydrated on sodium sulfate and evaporated to dryness to obtain 0.3 part of 10β - amino-3-N-pyrrolidyl-19-nor-androsta-3,5-diene-17-ol (I.R.: disapperance of 17-ketone band). The product was treated without further isolation with 6 parts methanol, 0.82 part sodium acetate, 0.82 part water and 0.64 part glacial acetic acid. It was left to reflux on a water bath for 4 hours and then evaporated to dryness and extracted with ethyl ether. The residue was washed with salt water to neutrality, then with a little distilled water. The product was dehydrated and evaporated to dryness and crystallized from ethyl ether to afford 0.18 part of 10β-amino-19-nor-testosterone; M.P. 190°–5° C.; $\alpha_D$=+113° ($CHCl_3$); $\lambda_{max}$=223 m$\mu$ (ethanol);

$\epsilon$=11,520

EXAMPLE 12

10β-amino-19-nor-androst-5-ene-3β-ol-17β-hydroxy-17α-methyl 0.7 part of 10β-amino-19-nor-androst - 5 - ene-3-β-ol-17-one in 30 parts anhydrous benzene were treated with 20 parts ethereal methylmagnesium bromide solution. The mixture was refluxed for two hours, then cooled and the excess reagent was decomposed with an ammonium chloride solution. The organic phase was extracted with ethyl acetate and washed with a saturated salt solution. 0.5 part raw product were obtained which crystallized from acetone to afford 10β-amino-19-nor-androst - 5 - ene-3β-ol-17β-hydroxy-17α-methyl; M.P. 221°–223° C.; $\alpha_D=119°$ (dioxane).

EXAMPLE 13

10β-amino-19-nor-androst-5-ene-3β-ol 17β-ol-17α-ethynyl 0.75 part of 10β-amino-19-nor-androst - 5 - ene-3β-ol-17-one were dissolved in 70 parts anhydrous tetrahydrofurane. The solution was kept at 0° C. for half an hour in a nitrogen stream, then for 30 minutes purified acetylene is bubbled thereinto. Within 15 minutes, 13 parts of a solution of the following composition were added: 0.75 part potassium in 17.5 parts tert. butyl alcohol. The mixture was kept in an acetylene stream for 6 hours and overnight in a refrigerator. The precipitate was filtered and dried under vacuum and then it was suspended in a saturated ammonium chloride solution and filtered. 0.570 part 10β-amino - 19 - nor-androst - 5 - ene-3β-ol-17β-ol-17α-ethynyl were obtained; $\alpha_D=-160°$ (dioxane); M.P. varied from one sample to another, owing certainly to different crystalline forms. The ascertained M.P. were: 212°–213.50° C.; 185°–188° C.; 160–166° C. All products are unitary and corresponded with each other after thin layer chromatographic examination.

EXAMPLE 14

10β-amino-19-nor-androst-5-ene-3β,17β-diol-17α-vinyl

By starting with 10β-amino - 19 - nor-androst-5-ene-3β-ol-17-one and employing vinylmagnesium chloride and operating as described in (Example 13) 10β-amino-19-nor-androst - 5 - ene-3β,17β-diol-17α-vinyl was obtained; M.P. 197°–200° C.

EXAMPLE 15

10β-amino-19-nor-androst-4-ene-3-one-17β-ol-17α-ethynyl 0.6 part of dehydrated 10β-amino-19-nor-androst-5-ene-3β,17β-diol-17α-ethynyl were warm dissolved in 2 parts dioxane, 38 parts anhydrous toluene and 6.4 parts cyclohexanone.

15 parts of solvent were distilled within 30 minutes and 0.6 part aluminum isopropylate dissolved in 6 parts anhydrous toluene were added dropwise within 15 minutes. The mixture was allowed to reflux for 5 hours, then cooled and 20 parts of saturated solution of Seignette salt were added. The aqueous phase was extracted and distilled in a steam stream. It was extracted with methylene chloride, washed with a little water and evaporated to dryness. The product was crystallized from isopropyl alcohol to obtain 0.3 part 10β-amino-19-nor-androst-4-ene-3-one-17β-ol-17α-ethynyl; M.P. 263°–265° C.; $\alpha_D=+31.5°$ (dioxane); $\lambda_{max}$ (ethanol)$=234$ mµ; $\epsilon=13,150$.

EXAMPLE 16

10β-amino-19-nor-17α-methyl-testosterone

By starting with 10β-amino-19-nor-androst - 5 - ene-3β,17β-diol-17α-methyl and proceeding as in Example 15, 10β-amino - 19 - nor-androst-4-ene - 3 - one-17β-ol-17α-methyl was obtained; M.P. 177°–179° C.; $\alpha_D=+79°$ C. (chloroform); $\lambda_{max}=235$ mµ (ethanol); $\epsilon=12,800$.

EXAMPLE 17

10β-amino-19-nor-androst-4-ene-3-one-17β-ol-17α-vinyl

By starting with 10β-amino-19-nor-androst - 5 - ene-3β,17β-diol-17α-vinyl and proceeding as described in Example 15, 10β-amino-19-nor-androst-4-ene - 3 - one-17β-ol-17α-vinyl was obtained; M.P. 200°–203° C.; $\alpha_D=55°$ C.; $\lambda_{max}=234$ mµ; $\epsilon=13,090$.

EXAMPLE 18

10β-carboxy-19-nor-androstane-3,17-diacetate 0.750 part of 10β-carboxy-19-nor-androst - 5 - ene-3,17-diacetate were dissolved in 20 parts ethanol and 0.150 part platinum oxide were added. The mixture was stirred for one hour during which an adsorption of 70 parts hydrogen occurred. Catalyst was filtered off, and the product was evaporated to dryness and crystallized from ethyl ether. 0.4 part 10β-carboxy - 19 - nor-androstane-3,17-diacetate were obtained; M.P. 207°–208° C.; $\alpha_D=55°$ (chloroform).

EXAMPLE 19

10β-carbamoyl-19-nor-α-androstane-3,17-diacetate

To 0.4 part of 10β-carboxy-19-nor-androstane-3,17-diacetate at 0° C., 1.6 parts thionyl chloride were added and the mixture was kept at 0° C. for half an hour and for 3 hours at room temperature. The mixture was evaporated to dryness and then 10 parts 28% aqueous ammonia were added and the mixture was stirred for one hour. The product was evaporated to dryness and extracted with ethyl ether. It was then washed to neutrality, dehydrated and evaporated to dryness. The product was crystallized from ethyl ether to yield 0.25 part of 10β-carbamoyl-19-nor-androstane-3,17-diacetate; M.P. 188°–190° C.; $\alpha_D=-76°$ (chloroform).

EXAMPLE 20

10β-amino-19-nor-androstane-3,17-diacetate 1.5 parts of 10β-carboxy-19-nor-androstane-3,17-diacetate in 150 parts anhydrous benzene were refluxed with 3 ml. thionyl chloride for 4 hours. The mixture was evaporated to dryness and combined again several times with benzene. The obtained acid chloride was dissolved in 30 parts anhydrous acetone and 0.55 part sodium azide were added at 0° C. The mixture was allowed to stand at 0° C. for half an hour, then for 3 hours at room temperature. After concentration, it was diluted with water, extracted with ether and washed with water until neutrality. The solution was then dehydrated and evaporated to dryness. I.R. spectrum shows that a great part of the product is under the form of 10β-carbonylazide-19-nor-androstane-3,17-diacetate. To the obtained product, 100 parts toluene were added, keeping the mixture for one hour on a water bath. The mixture was evaporated to dryness to obtain 10β - isocyanato - 19 - nor - androstane - 3,17 - diacetate (I.R. 2260 cm.$^{-1}$: —N=C=O).

This product was warm dissolved in 100 parts of a 50% acetic acid solution and kept for 3 hours on a water bath. After evaporation to dryness, the I.R. spectrum did not show the isocyanato band. The product was subjected to chromatography on silicagel to obtain 0.3 part of 10β-amino-19-nor-androstane-3,17-diacetate; M.P. 162°–164° C.; $\alpha_D=-81°$ (chloroform).

EXAMPLE 21

10β-isocyanato-19-nor-testosterone-17β-propionate 2 parts of 10β-carboxy-19-nor-androst-4-ene-3-one-17β-propionate were dissolved in 100 parts acetone and 0.6 part water and 8.4 parts of a solution consisting of 1.14 parts triethylamine and 10 parts acetone as well as 8.4 parts of a solution consisting of 0.86 part ethyl chlorocarbonate and 10 parts acetone were added at 0° C. The mixture was allowed to stand for 30 minutes at 0° C., thereafter 0.6 part sodium azide in 5 parts water were added, keeping the mixture at 0° C. for 2 hours. The product was diluted with water, extracted with ethyl ether, washed with water, dehydrated and evaporated to dryness. 1.3 parts of 10β-carbonylazide-19-nor-androst-4-ene-3-one-17-propionate were obtained (I.R. 2120 cm.$^{-1}$: $N_3$), which were dissolved in 100 parts toluene and kept for two hours on a water bath until small bubbles were produced. It was then evaporated to dryness to obtain 1.05 parts of 10β-isocyanato-19-nor-testosterone-17β-propionate. The obtained product was subjected to chromatography on silica-gel column and, by elution with a mixture of hexane and methylene chloride (8:2), 0.6 part of 10β-isocyanato-19-nor-testosterone-17β-propionate were obtained; M.P. 82°–85° C.; $\alpha_D = +154°$ C. (chloroform).

EXAMPLE 22

10β-amino-19-nor-testosterone-17β-propionate 0.5 part of 10β-isocyanato-19-nor-testosterone-17β-propionate were dissolved in 50 parts of 50% acetic acid solution and heated on a water bath for 2 hours. The mixture was evaporated to dryness. The product did not crystallize, therefore it was subjected to chromatography on silicagel and by elution with hexane-ethyl ether (7:3), 0.27 part of 10β-amino-19-nor-testosterone-17β-propionate were obtained; M.P. 125°–127° C.; $\alpha_D = +100°$ (chloroform); $\lambda_{max} = 234$ mμ; $\epsilon = 13,800$.

EXAMPLE 23

10β-propionamido-19-nor-androst-4-ene-3-one-17β-propionate 0.2 part of 10β-amino-19-nor-androst-4-ene-3-one-17β-propionate were propionylated under the usual conditions to afford 0.2 part of 10β-propionamide-19-nor-androst-4-ene-3-one-17β-propionate; M.P. 232°–234° C.; $\lambda_{max} = 248$ mμ; $\epsilon = 12,700$.

EXAMPLE 24

10β-carbomethoxyamino-19-nor-androst-4-ene-3-one-17β-propionate 0.5 part of 10β-isocyanato-19-nor-androst-4-ene-3-one-17β-propionate were refluxed for 5 hours in 50 parts methanol. The mixture was evaporated to dryness and the disappearance of the isocyanate band was ascertained by I.R. spectrum analysis. The product was subjected to chromatography on silicagel column and eluated with ethyl ether/hexane (1:1) to obtain 0.370 part of 10β-urethane - 19 - nor - androst-4-ene-3-one-17β-propionate; M.P. 172°–176° C.; $\alpha_D = +42°$ C. (in chloroform); $\lambda_{max} = 239$ mμ; $\epsilon = 13,500$.

EXAMPLE 25

10β-ureido-19-nor-androst-4-ene-3-one-17β-propionate 0.5 part of 10β-isocyanato-19-nor-androst-4-ene-3-one-17β-propionate were treated with 200 parts of ammonia for two hours at 0° C. and the ammonia was allowed to evaporate. The product was subjected to chromatography on silica-gel to give 0.15 part of 10β-ureido-19-nor-androst-4-ene-3-one-17β-propionate; M.P. 220°–224° C.

EXAMPLE 26

10β-amino-19-nor-androsta-4,6-diene-3,17-one 0.5 part of 10β-amino-3-ethoxy-19-nor-androsta-3,5-diene17-one dissolved in 30 parts of anhydrous dioxane were extracted with 0.35 part of 2,3-dicyano-5,6-dichlorbenzoquinone. The mixture was allowed to stand at room temperature for 30 minutes, then it was diluted with methylene chloride and subjected to chromatography on alumina. 0.23 part of 10β-amino-19-nor-androsta-4,6-dien-3,17-one were obtained; M.P. 193°–195° C.; $\lambda_{max} = 284$ mμ; $\epsilon = 19,500$.

The same product was obtained by refluxing 10β-amino-19-nor-androst-4-ene-3,17-dione with chloranyl in tert.-butyl alcohol.

We claim:
1. A compound of the formula

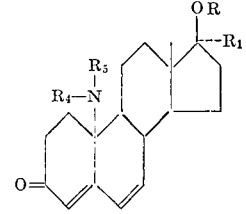

wherein

R is hydrogen, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl or phenylacetyl;

$R_1$ is hydrogen, lower alkyl, alkynyl of the formula
—C≡C—Ra or alkenyl of the formula —CH=CH—Ra where Ra is hydrogen or lower alkyl;

OR and $R_1$ together are keto;

$R_4$ is hydrogen or methyl; and $R_5$ is hydrogen, methyl, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl or phenylacetyl, —COOR$_9$, where $R_9$ is methyl, ethyl, propyl, butyl, cyclohexyl, phenyl or phenylmethylene or —CONHR$_9$ where $R_9$ is hydrogen, methyl, ethyl, propyl, butyl, cyclohexyl, phenyl or phenylmethylene.

2. The compound of claim 1 wherein R is hydrogen or alkanoyl of 1 to 10 carbon atoms and $R_5$ is hydrogen, methyl, alkanoyl of 1 to 10 carbon atoms or —COOR$_9$ or —CONHR$_9$ where $R_9$ is methyl, ethyl, propyl or butyl.

3. A compound of the formula

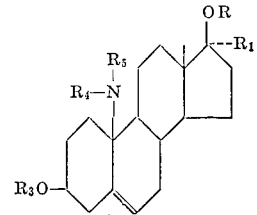

wherein

R is hydrogen, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl or phenylacetyl;

$R_1$ is hydrogen, lower alkyl, alkynyl of the formula —C≡CRa or alkenyl of the formula —CH=CHRa wherein Ra is hydrogen or lower alkyl;

OR and $R_1$ together are keto;

$R_3$ is hydrogen, formyl, acetyl or benzylcarboyl;

$R_4$ is hydrogen or methyl;

$R_5$ is hydrogen, methyl alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl or phenylacetyl or —COOR$_9$ or —CONHR$_9$ where $R_9$ is methyl, ethyl, propyl, butyl, cyclohexyl, phenyl or phenylmethylene; and t represents a single or double bond and where the hydrogen atom at C-5 has the α configuration when t represents a single bond.

4. The compound of claim 3 wherein R is hydrogen or alkanoyl of 1 to 10 carbon atoms and $R_5$ is hydrogen, methyl, alkanoyl of 1 to 10 carbon atoms or —COOR$_9$ or —CONHR$_9$ where $R_9$ is methyl, ethyl, propyl or butyl.

5. A compound of the formula

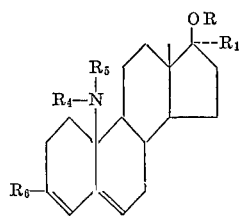

wherein

R is hydrogen, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl or phenylacetyl;

$R_1$ is hydrogen, lower alkyl, alkynyl of the formula —C≡CRa or alkenyl of the formula —CH=CHRa wherein Ra is hydrogen or lower alkyl;

OR and $R_1$ together are keto;

$R_4$ is hydrogen or methyl;

$R_5$ is hydrogen, methyl, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl or phenylacetyl, or —COOR$_9$ or —CONHR$_9$ where $R_9$ is methyl, ethyl, propyl, butyl, cyclohexyl, phenyl or phenylmethylene; and $R_6$ is methoxy, ethoxy, morpholino, pyrrolidyl or piperidino.

6. The compound of claim 5 wherein R is hydrogen or alkanoyl of 1 to 10 carbon atoms and $R_5$ is hydrogen, methyl, alkanoyl of 1 to 10 carbon atoms or —COOR$_9$ or —CONHR$_9$ where $R_9$ is methyl, ethyl, propyl or butyl.

7. A compound of the formula

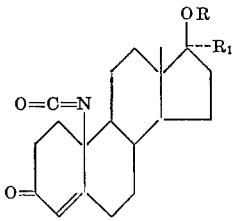

wherein

R is hydrogen, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl or phenylacetyl;

$R_1$ is hydrogen, lower alkyl, alkynyl of the formula —C≡CRa or alkenyl of the formula —CH=CHRa wherein Ra is hydrogen or lower alkyl; and OR and $R_1$ together are keto.

8. The compound of claim 7 wherein R is hydrogen or alkanoyl of 1 to 10 carbon atoms.

9. A compound of the formula

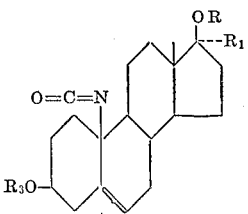

wherein

R is hydrogen, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl or phenylacetyl;

$R_1$ is hydrogen, lower alkyl, alkynyl of the formula —C≡CRa or alkenyl of the formula —CH=CHRa wherein Ra is hydrogen or lower alkyl;

OR and $R_1$ together are keto;

$R_3$ is hydrogen, formyl, acetyl or benzylcarboyl; and $t$ represents a single or double bond and wherein the hydrogen atom at C–5 has the α configuration when $t$ represents a single bond.

10. The compound of claim 9 wherein R is hydrogen or alkanoyl of 1 to 10 carbon atoms.

11. A compound of the formula

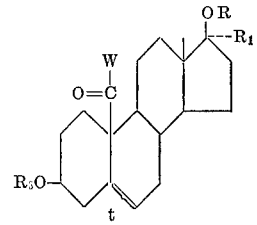

wherein

R is hydrogen, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl or phenylacetyl;

$R_1$ is hydrogen, lower alkyl, alkynyl of the formula —C≡CRa or alkenyl of the formula —CH=CHRa wherein Ra is hydrogen or lower alkyl;

OR and $R_1$ together are keto;

$R_3$ is hydrogen, formyl, acetyl or benzylcarboyl;

W is —$N_3$, —NHOCOC$_6$H$_5$, NH$_2$ or —OCOOC$_2$H$_5$, and $t$ represents a single or double bond and wherein the hydrogen atom at C–5 has the α configuration when $t$ represents a single bond.

12. The compound of claim 11 wherein R is hydrogen or alkanoyl of 1 to 10 carbon atoms and W is —$N_3$, —NHOCOC$_6$H$_5$, —NH$_2$ or —OCOOC$_2$H$_5$.

13. A process for the preparation of a 10β-amino compound of the formula:

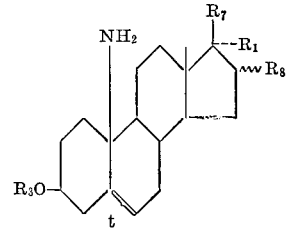

wherein $R_1$ is hydrogen, lower alkyl, alkyne of the formula —C≡CRa or alkene of the formula —CH=CHRa wherein Ra is hydrogen or lower alkyl;

$R_7$ and $R_1$ together are keto,

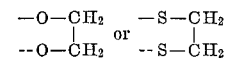

$R_3$ is hydrogen, formyl, acetyl or benzylcarboyl;

$R_7$ is acyloxy where the acyl group is derived from a saturated aliphatic carboxylic acid containing 1 to 10 carbon atoms, cyclopentylacetic acid, cyclopentylpropionic acid, cyclohexylpropionic acid, succinic acid, glutaric acid, methylsuccinic acid, benzoic acid, salicylic acid, p-aminobenzoic acid, phenylpropionic acid or phenylacetic acid;

$R_8$ is hydrogen or lower alkyl; and $t$ represents a single or double bond and wherein C–5 has the α configuration when $t$ represents a single bond, comprising reacting a compound of the formula:

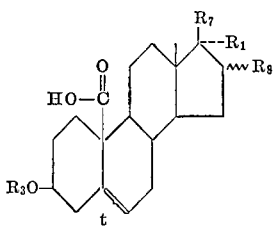

or an alkali metal salt thereof wherein $R_1$, $R_3$, $R_7$, $R_8$ and $t$ are as defined with respect to said $10\beta$-amino compound and wherein C-5 has the $\alpha$ configuration when $t$ represents a single bond with thionyl chloride, oxalyl chloride, $PCl_5$ or $POCl_3$ in a solvent selected from the group consisting of benzene, ether, hexane and dimethylformamide, reacting the resulting product with an alkali metal azide, ammonia or hydroxylamine and benzoyl chloride and placing the resulting product in a medium selected from the group consisting of benzene, water, acetic acid, hydrochloric acid, ether and mixtures thereof to form said $10\beta$-amino compound.

14. A process for the preparation of a $10\beta$-amino compound of the formula:

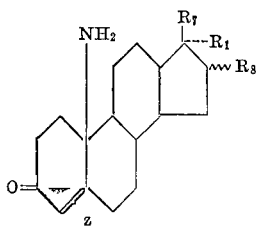

wherein $R_1$ is hydrogen, lower alkyl, alkyne of the formula $-C\equiv CRa$ or alkene of the formula $-CH=CHRa$ wherein Ra is hydrogen or lower alkyl;

$R_7$ and $R_1$ together are keto,

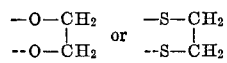

$R_8$ is hydrogen or lower alkyl; and $z$ represents a single or double bond and wherein C-5 has the $\alpha$ configuration when $z$ represents a single bond, comprising reacting a compound of the formula:

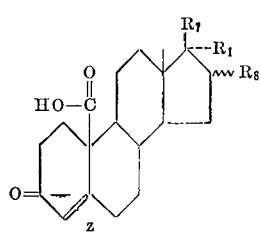

or an alkali metal salt thereof wherein $R_1$, $R_7$, $R_8$ and $z$ are as defined with respect to said $10\beta$-amino compound and wherein C-5 has the $\alpha$ configuration when $z$ represents a single bond with thionyl chloride, oxalyl chloride, $PCl_5$ or $POCl_3$ in a solvent selected from the group consisting of benzene, ether, hexane and dimethylformamide, reacting the resulting product with an alkali metal azide, ammonia or hydroxylamine and benzoyl chloride and placing the resulting product in a medium selected from the group consisting of benzene, water, acetic acid, hydrochloric acid, ether and mixtures thereof to form said $10\beta$-amino compound.

15. A process for the preparation of a $10\beta$-amino compound of the formula:

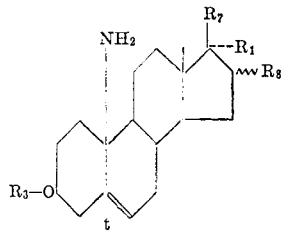

wherein $R_1$ is hydrogen, lower alkyl, alkyne of the formula $-C\equiv CRa$ or alkene of the formula $-CH=CHRa$ wherein Ra is hydrogen or lower alkyl;

$R_7$ and $R_1$ together are keto,

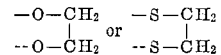

$R_3$ is hydrogen, formyl, acetyl or benzylcarboyl;

$R_7$ is acyloxy where the acyl group is derived from a saturated aliphatic carboxylic acid containing 1 to 10 carbon atoms, cyclopentylacetic acid, cyclopentylpropionic acid, cyclohexylpropionic acid, succinic acid, glutaric acid, methylsuccinic acid, benzoic acid, salicylic acid, p-aminobenzoic acid, phenylpropionic acid or phenylacetic acid;

$R_8$ is hydrogen or lower alkyl; and $t$ represents a single or double bond and wherein C-5 has the $\alpha$ configuration when $t$ represents a single bond, comprising reacting a compound of the formula:

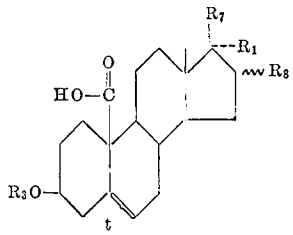

wherein $R_1$, $R_3$, $R_7$, $R_8$ and $t$ are as defined with respect to said $10\beta$-amino compound and wherein C-5 has the $\alpha$ configuration when $t$ represents a single bond with ethyl chlorocarbonate or an acid of the formula $R_{10}COOH$ wherein $R_{10}$ is methyl, ethyl, propyl, butyl, cyclohexyl, phenyl or phenylmethylene in a solvent selected from the group consisting of acetone, tetrahydrofurane, dioxane, benzene or dimethylformamide to form a $10\beta$-carboxyanhydride compound of the formula:

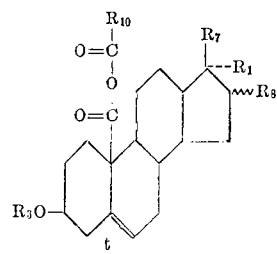

wherein $R_1$, $R_3$, $R_7$, $R_8$ and $t$ are as defined with respect to said $10\beta$-amino compound, $R_{10}$ is methyl, ethyl, propyl, butyl, cyclohexyl, phenyl or phenylmethylene when said acid is reacted and ethoxy when said ethyl chlorocarbonate is reacted and wherein C-5 has the $\alpha$ configuration when $t$ represents a single bond, reacting said $10\beta$-carboxyanhydride compound with an alkali metal azide, ammonia or hydroxylamine and benzoyl chloride and placing the resulting product in a medium selected from the group consisting of benzene, toluene and ether to form a 10β-isocyanato compound of the formula:

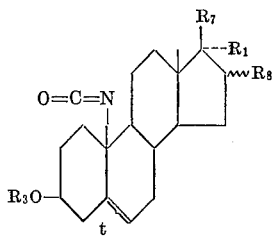

wherein $R_1$, $R_3$, $R_7$, $R_8$ and $t$ are as defined with respect to said 10β-amino compound and wherein C–5 has the α configuration when $t$ represents a single bond and placing said 10β-isocyanato compound in a medium selected from the group consisting of water, acetic acid, hydrochloric acid and mixtures thereof to form said 10β-amino compound.

16. A process for the preparation of a 10β-amino compound of the formula:

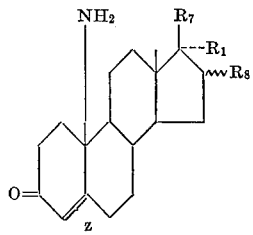

wherein
$R_1$ is hydrogen, lower alkyl, alkyne of the formula —C≡CRa or alkene of the formula —CH=CHRa wherein Ra is hydrogen or lower alkyl;
$R_7$ and $R_1$ together are keto,

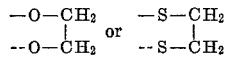

$R_7$ is acyloxy where the acyl group is derived from a saturated aliphatic carboxylic acid containing 1 to 10 carbon atoms, cyclopentylacetic acid, cyclopentylpropionic acid, cyclohexylpropionic acid, succinic acid, glutaric acid, methylsuccinic acid, benzoic acid, salicyclic acid, p-aminobenzoic acid, phenylpropionic acid or phenylacetic acid;
$R_8$ is hydrogen or lower alkyl; and
z represents a single or double bond; and wherein C–5 has the α configuration when z represents a single bond, comprising reacting a compound of the formula:

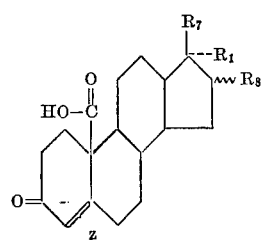

wherein $R_1$, $R_7$, $R_8$ and z are as defined with respect to said 10β-amino compound and wherein C–5 has the α configuration when z represents a single bond with ethyl chlorocarbonate or an acid of the formula $R_{10}COOH$ wherein $R_{10}$ is methyl, ethyl, propyl, butyl, cyclohexyl, phenyl or phenylmethylene in a solvent selected from the group consisting of acetone, tetrahydrofurane, dioxane, benzene or dimethylformamide to form a 10β-carboxyanhydride compound of the formula:

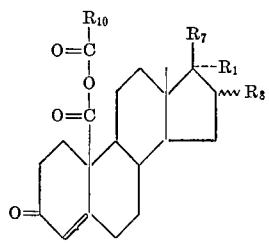

wherein $R_1$, $R_7$, $R_8$ and z are as defined with respect to said 10β-amino compound, $R_{10}$ is methyl, ethyl, propyl, butyl, cyclohexyl, phenyl or phenylmethylene when said acid is reacted and ethoxy when said ethyl chlorocarbonate is reacted and wherein C–5 has the α configuration when z represents a single bond, reacting said 10β-carboxyanhydride compound with an alkali metal azide, ammonia or hydroxylamine and benzoyl chloride and placing the resulting product in a medium selected from the group consisting of benzene, toluene and ether to form a 10β-isocyanato compound of the formula:

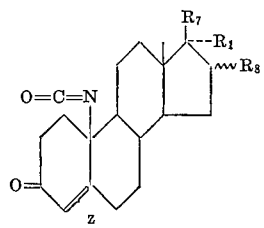

wherein $R_1$, $R_7$, $R_8$ and z are as defined with respect to said 10β-amino compound and wherein C–5 has the α configuration when z represents a single bond and placing said 10β-isocyanato compound in a medium seelcted from the group consisting of water, acetic acid, hydrochloric acid, ether and mixtures thereof to form said 10β-amino compound.

References Cited
UNITED STATES PATENTS
3,278,565 10/1966 Bowers _____ 260—397.4
3,417,111 12/1968 Knox _____ 260—397.1

ELBERT L. ROBERTS, Primary Examiner

U.S. Cl. X.R.
260—239.5, 239.55, 349, 397.2, 396.3, 397.4, 397.5